(12) United States Patent
Seo

(10) Patent No.: US 10,359,824 B2
(45) Date of Patent: Jul. 23, 2019

(54) DISPLAY APPARATUS FOR SUPPLYING POWER TO EXTERNAL APPARATUS AND CONTROL METHOD OF THE SAME

(71) Applicant: SAMSUNG ELECTRONICS CO., LTD., Suwon-si (KR)

(72) Inventor: Ho-seong Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 393 days.

(21) Appl. No.: 15/204,044

(22) Filed: Jul. 7, 2016

(65) Prior Publication Data

US 2017/0017283 A1 Jan. 19, 2017

(30) Foreign Application Priority Data

Jul. 16, 2015 (KR) .......................... 10-2015-0101051

(51) Int. Cl.
| | |
|---|---|
| G09G 5/00 | (2006.01) |
| G06F 1/26 | (2006.01) |
| H04L 29/08 | (2006.01) |
| G06F 13/42 | (2006.01) |
| G06F 3/16 | (2006.01) |
| G06F 1/28 | (2006.01) |

(52) U.S. Cl.
CPC .............. *G06F 1/266* (2013.01); *G06F 1/263* (2013.01); *G06F 1/28* (2013.01); *G06F 3/16* (2013.01); *G06F 13/4282* (2013.01); *G09G 5/003* (2013.01); *H04L 67/34* (2013.01); *G09G 2330/021* (2013.01)

(58) Field of Classification Search
CPC . G06F 1/266; G06F 1/263; G06F 1/28; G06F 3/16; G06F 13/4282; G09G 5/003; H04L 67/34
USPC ........................................................ 345/211
See application file for complete search history.

(56) References Cited

U.S. PATENT DOCUMENTS

| | | | |
|---|---|---|---|
| 6,345,364 B1 * | 2/2002 | Lee .......................... | G06F 1/266 713/324 |
| 2006/0035527 A1 * | 2/2006 | Numano ................. | G06F 1/266 439/668 |
| 2010/0097030 A1 * | 4/2010 | Kim ...................... | G06F 1/1601 320/106 |
| 2011/0291609 A1 * | 12/2011 | Bae ....................... | H02J 7/0054 320/103 |

(Continued)

FOREIGN PATENT DOCUMENTS

KR 10-0655033 B1 12/2006

*Primary Examiner* — Adam J Snyder
(74) *Attorney, Agent, or Firm* — Sughrue Mion, PLLC

(57) ABSTRACT

A display apparatus including a display configured to display an image; a connecting section configured to connect with an external apparatus that includes at least one operating section and a charging section to be charged with power to be supplied to the operating section; a power supply configured to supply power to the external apparatus connected to the connecting section; and a controller configured to receive information about power used by at least one operating section of the external apparatus connected to the connecting section, determine a level of power supplied to the external apparatus according to the received power information and usage power of the display, and control the power supply to supply power having the determined level to the external apparatus.

20 Claims, 18 Drawing Sheets

(56) References Cited

U.S. PATENT DOCUMENTS

| | | | |
|---|---|---|---|
| 2012/0139474 A1* | 6/2012 | Cho | G09G 3/2092 320/106 |
| 2013/0162198 A1* | 6/2013 | Yokota | H02J 7/007 320/107 |
| 2013/0166928 A1* | 6/2013 | Yang | G06F 1/266 713/300 |
| 2014/0013137 A1* | 1/2014 | Wilson | G06F 1/00 713/323 |
| 2016/0306404 A1* | 10/2016 | Santos Martinez | G06F 1/266 |

* cited by examiner

FIG. 17

| Monitor Brightness table | | Notebook Brightness table | |
|---|---|---|---|
| 100 | 0(charging Value) | 100 | 0(charging Value) |
| 90 | 10 | 90 | 10 |
| 80 | 20 | 80 | 20 |
| 70 | 30 | 70 | 30 |
| 60 | 40 | 60 | 40 |
| 50 | 50 | 50 | 50 |
| 40 | 60 | 40 | 60 |
| 30 | 70 | 30 | 70 |
| 20 | 80 | 20 | 80 |
| 10 | 90 | 10 | 90 |
| 0 | 100 | 0 | 100 |

US 10,359,824 B2

DISPLAY APPARATUS FOR SUPPLYING POWER TO EXTERNAL APPARATUS AND CONTROL METHOD OF THE SAME

CROSS-REFERENCE TO RELATED APPLICATION(S)

This application claims priority from Korean Patent Application No. 10-2015-0101051 filed on Jul. 16, 2015 in the Korean Intellectual Property Office, the disclosure of which is incorporated herein by reference in its entirety.

BACKGROUND

Field

Apparatuses and methods consistent with the exemplary embodiments relate to a display apparatus and a control method of the same, and more particularly to a display apparatus that supplies higher power than before to a connected external apparatus so as to more quickly charge the external apparatus, and a control method of the same.

Description of the Related Art

A conventional display apparatus of the related art supplies power to an external apparatus through a cable when the external apparatus is connected thereto. In the external apparatus, all but currently used power of the maximum usable power is supplied to and charged in a rechargeable battery. Referring to FIG. 2, an external apparatus 2 is connected to a conventional display apparatus 1 of the related art by a cable. The display apparatus 1 supplies power of 30 W from a switching mode power supply (SMPS) 11 to the external apparatus 2 through a line 14 for outputting a voltage of 5V in a connecting section 13 to which the external apparatus 2 is connected. The external apparatus 2 uses the received power of 30 W as power for driving an operating section 21 and supplies and charges the charging section 22 with surplus power of 10 W. The display apparatus 1 includes a plurality of elements for driving a display 12 and the like, which are driven by power supplied from the SMPS 11 and having a voltage of 14V.

The display 12 of the display apparatus 1 does not always have brightness corresponding to the maximum usable power. In other words, all the power supplied from the SMPS 11 is not consumed in the display 12. If this power not consumed in the display 12 is supplied to the connected external apparatus 2, the charging section 22 of the external apparatus 2 will be more quickly charged than before.

SUMMARY

According to an aspect of an exemplary embodiment, there is provided a display apparatus including: a display configured to display an image; a connecting section configured to connect with an external apparatus, the external apparatus including at least one operating section and a charging section to be charged with power to be supplied to the operating section; a power supply configured to supply power to the external apparatus connected to the connecting section; and a controller configured to receive information about power used by at least one operating section of the external apparatus connected to the connecting section, determine a level of power supplied to the external apparatus according to the received power information and usage power of the display, and control the power supply to supply power having the determined level to the external apparatus.

The controller may be further configured to request information about maximum usable power of the external apparatus to the external apparatus, and receive the information about maximum usable power of the external apparatus from the external apparatus.

The connecting section may include a universal serial bus (USB) C-type.

The controller may be further configured to determine the level of the power based on at least one among image quality information about image display in the external apparatus, sound information, and driving rate information of the operating section.

The display apparatus may include a sound outputter configured to output a sound, wherein the controller may be further configured to determine the level of the power based on at least one among image quality information of the display, sound information of the sound output unit, and driving rate information of the display apparatus.

The power supply may include a first output power line through which a first output power is output, and a second output power line through which a second output power that is different from the first output power is output.

One of the first output power line and the second output power line may be connected to the connecting section, and the other of the first output power line and the second output power line may be connected to the display.

A voltage corresponding to the external apparatus may be output through the first output power line, and a voltage of the second output power may be higher than the voltage of the first output power.

The display apparatus may include a power regulator configured to regulate a level of the power output from the power supply, wherein the power regulator may be disposed between the power supply and the connecting section.

The display apparatus may include a third output power line branched from a point on an output line between the power supply and the display, to connect the power supply from the branched point to the connecting section.

The display apparatus may include a transformer configured to transform a voltage output from the power supply, wherein the transformer may be disposed in the third output power line.

The display apparatus may include a transformer configured to transform a voltage output from the power supply, wherein a third output power line may be branched from a point on an output line between the power supply and the display, and the transformer may be disposed in the third output power line between the branched point and the power regulator.

The transformer may be disposed in the third output power line between the branched point and the connecting section.

The display apparatus may include a switching section for selectively connecting the branched point and the transformer, wherein the controller may be further configured to control the switching section to connect the branched point and the transformer in response to the usage power of the display being lower than the maximum usable power.

The display apparatus may include a switching section for selectively connecting the branched point and the transformer, wherein the controller may be further configured to control the switching section to connect the branched point and the transformer in response to the usage power of the display being lower than the maximum usable power.

According to an aspect of another exemplary embodiment, there is provided a method of controlling a display apparatus, the method including: connecting with an external apparatus including at least one operating section and a charging section to be charged with power to be supplied to the operating section; receiving information about power used by at least one operating section of the external apparatus connected to the connecting section; determining a level of power supplied to the external apparatus according to the received power information and usage power of the display; and supplying power having the determined level to the external apparatus.

The receiving the power information may include: requesting information about maximum usable power of the external apparatus to the external apparatus, and receiving the information about maximum usable power from the external apparatus.

The connection with the external apparatus may be achieved by a universal serial bus (USB) C-type.

The determining the level of the power may include determining the level of the power based on at least one among image quality information about image display in the external apparatus, sound information, and driving rate information of the operating section.

The determining the level of the power may include determining the level of the power based on at least one among image quality information of the display, sound information, and driving rate information of the display apparatus.

BRIEF DESCRIPTION OF THE DRAWINGS

The above and/or other aspects will become apparent and more readily appreciated from the following description of exemplary embodiments, taken in conjunction with the accompanying drawings, in which:

FIG. 17 is a table showing chargeable values with regard to brightness information of the display apparatus according to an exemplary embodiment and brightness information of the external apparatus.

DETAILED DESCRIPTION OF EXEMPLARY EMBODIMENTS

Below, exemplary embodiments will be described in detail with reference to accompanying drawings. The inventive concept may be achieved in various ways, and is not limited to the exemplary embodiments set forth herein. Further, like numerals refer to like elements throughout.

Figure 1:
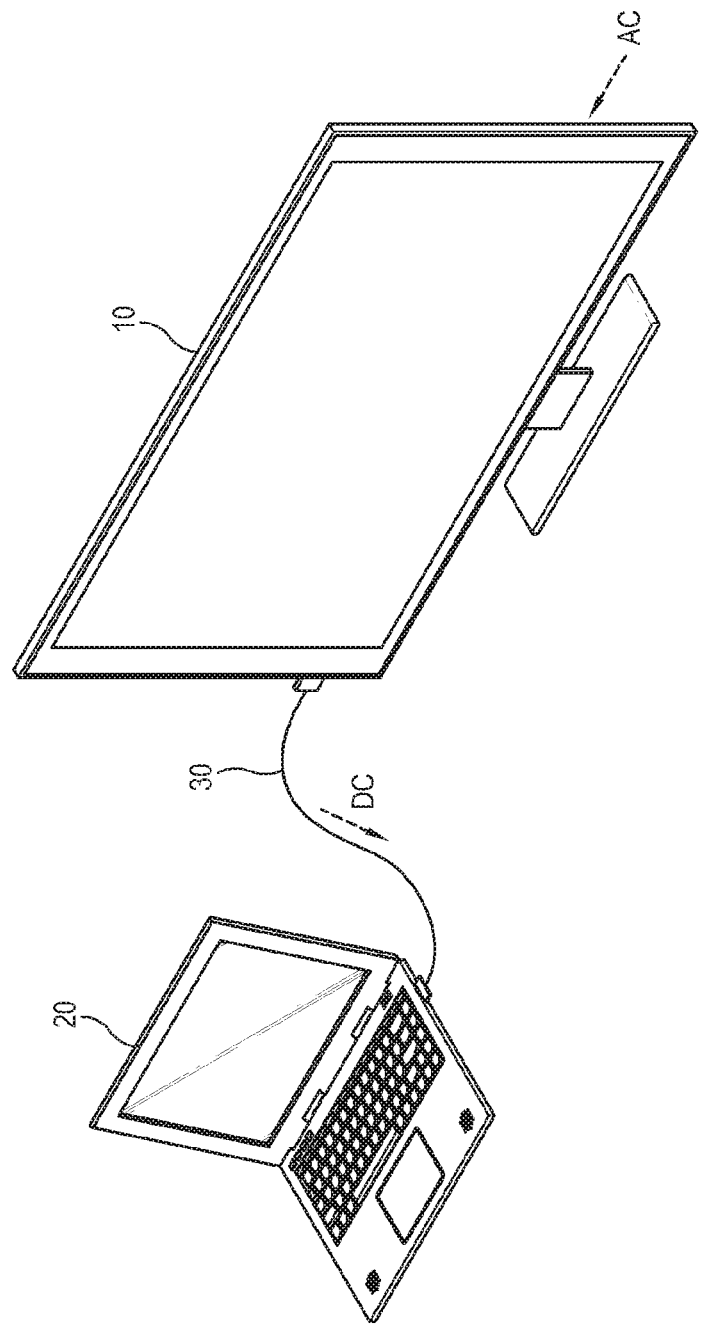
FIG. 1 is a view illustrating a display apparatus and an external apparatus that are connected, according to an exemplary embodiment.

FIG. 1 is a view of schematically showing that a display apparatus 10 and an external apparatus 20 are connected according to an exemplary embodiment.

While a user is using the display apparatus 10 to view an image, another user connects his/her notebook computer 20, which needs to be charged as its charged power level goes down, to the display apparatus 10 by a cable 30. The display apparatus 10 receives alternating current (AC) power and converts it into a direct current (DC) power having at least one voltage, thereby supplying the DC power to the internal elements thereof. Thus, the display apparatus 10 supplies the DC power to the notebook computer 20 when the external apparatus, i.e., the notebook computer 20 is connected to a connecting section of the display apparatus 10 through the cable 30. The display apparatus 10 and the notebook computer 20 may exchange data with each other. The cable 30, by which the display apparatus 10 and the notebook computer 20 are connected, may have a connecting part having a shape of type C. Likewise, the connecting sections of the display apparatus 10 and notebook computer 20 may have ports shaped corresponding to the type C. The display apparatus 10 may be achieved by a smart TV, a monitor, a tablet PC and a notebook computer, etc. and the external apparatus 20 may be also achieved by a smart phone, a tablet PC as well as the notebook computer.

Figure 2:
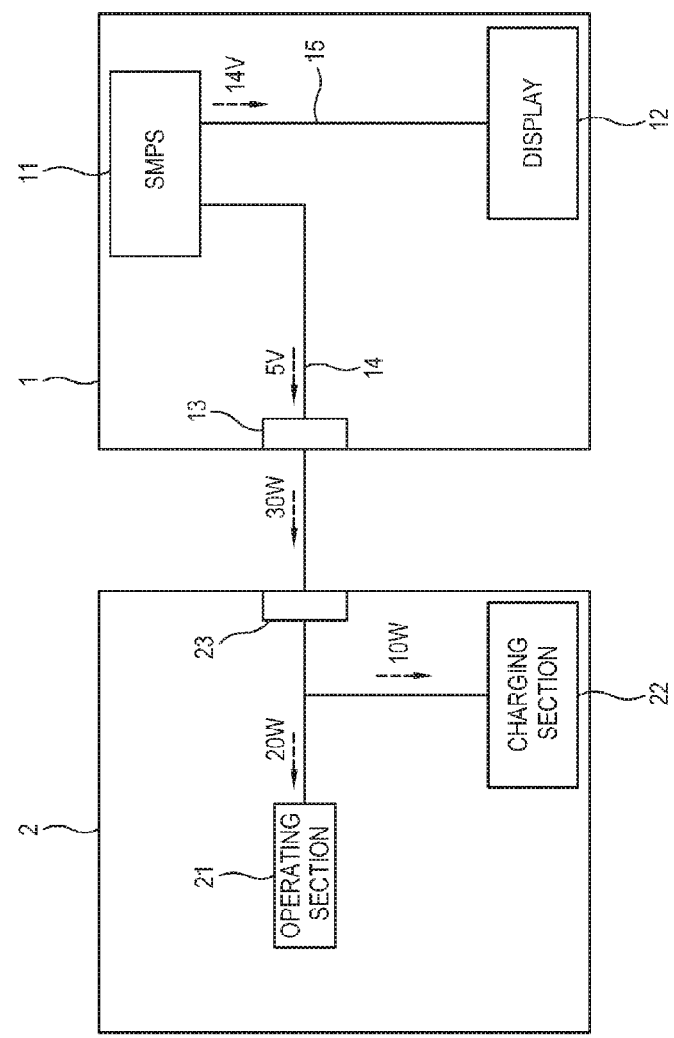
FIG. 2 is a schematic view showing a conventional display apparatus of the related art that supplies power to a connected external apparatus.

FIG. 2 is a schematic view showing that a conventional display apparatus 1 of the related art supplies power to the connected external apparatus 2.

The conventional display apparatus 1 of the related art includes a switching mode power supply (SMPS) 11 for supplying power, a display 12 for displaying an image, a connecting section 13 for connecting with the external apparatus 2, a first output power line 14 via which the output power is supplied from the SMPS 11 to the connecting section 13, and a second output power line 15 via which the output power is supplied from the SMPS 11 to the display 12. On the other hand, the external apparatus 2 to be connected to the conventional display apparatus 1 of the related art internally includes an operating section 21 for performing operations of the external apparatus 2, a charging section 22 charged with power to be supplied to the operating section 21, an external apparatus connecting section 23 for connecting with the display apparatus 1, and a power line via which power is supplied to the operating section 21 and the charging section 22.

When the external apparatus 2 is connected to the conventional display apparatus 1 of the related art, the output power 30 W having a voltage of 5V supplied from the SMPS 11 to the connecting section 13 via the first output power line 14 is supplied to the external apparatus connecting section 23 of the external apparatus 2 through the cable. In the supplied power of 30 W, power of 20 W is consumed by the operating section 21 for operating the external apparatus 2, and remaining power of 10 W is supplied to the charging section and consumed for charging. The SMPS 11 of the display apparatus 1 outputs power having a voltage of 14V to the display 12 through the second output power line 15. A user, who is using the conventional display apparatus 1 of the related art, views an image through the display 12 set with proper brightness. If the display is not set to the maximum brightness, the power for the maximum brightness is not consumed. For example, if power needed for the maximum brightness of the display 12 is 30 W and the brightness set by a user is about 70% of the maximum brightness, the display 12 has to consume power of 21 W in order to exhibit the brightness set by him/her. However, the SMPS 11 supplies the maximum power of 30 W to the display 12 regardless of the set brightness. Therefore, in the power of 30 W supplied to the display 12, the power of 21 W is used but the remaining power of 9 W is wasted.

Figure 3:
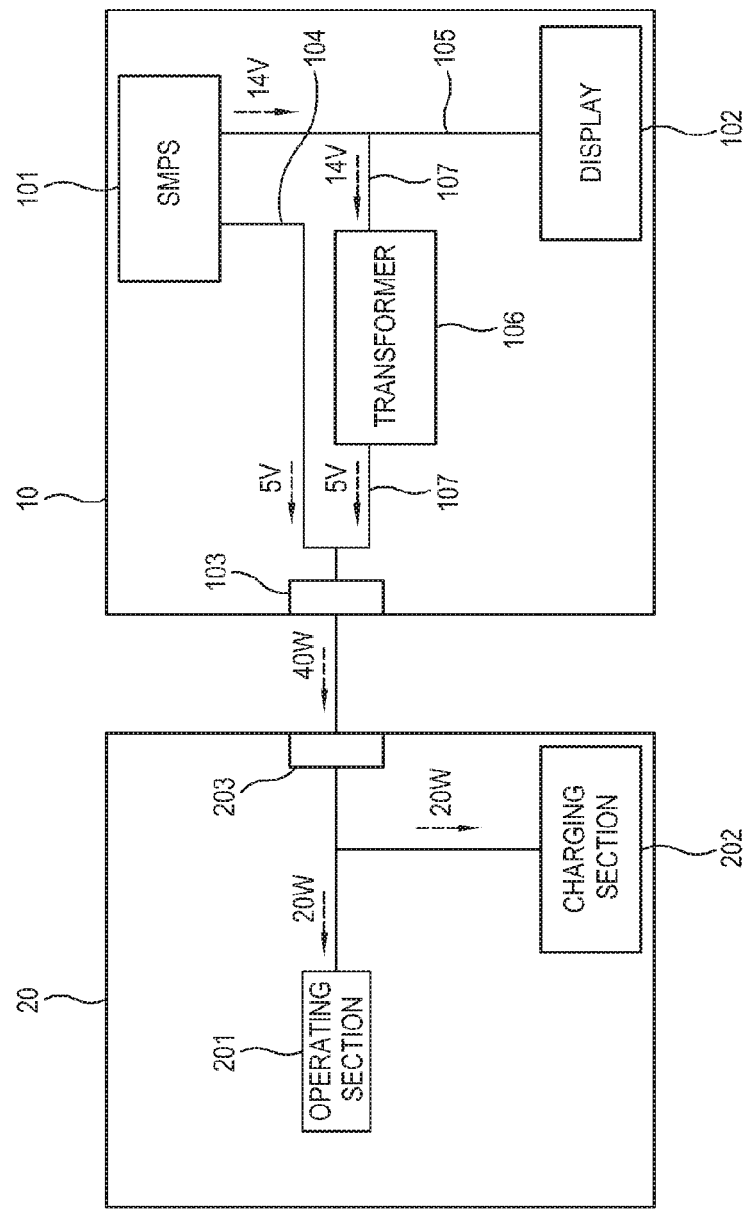
FIGS. 3 and 4 are schematic views showing that a display apparatus according to an exemplary embodiment supplies power to an external apparatus.

FIG. 3 is a schematic views showing that a display apparatus 10 according to an exemplary embodiment supplies power to an external apparatus 20.

The display apparatus 10 according to an exemplary embodiment includes an SMPS 101 for supplying power, a display 102 for displaying an image, a connecting section 103 for connecting with the external apparatus 20, a first output power line 104 via which the output power from the SMPS 101 is supplied to the connecting section 103, a second output power line 105 via which the output power from the SMPS 101 is supplied to the display 102, a transformer 106 for transforming an output voltage of the second output power line 105 from 14V into 5V, and a third output power line 107 via which the output voltage of 14V is supplied from the second output power line 105 to the transformer 106 and the voltage of 5V transformed by the transformer 106 is supplied to the connecting section 103. The external apparatus 20 to be connected to the display apparatus 10 according to an exemplary embodiment internally includes an operating section 201 for operating the external apparatus 20, a charging section 202 charged with power to be supplied to the operating section 201, an external apparatus connecting section 203 for connecting with the display apparatus 10, and power lines via which power is supplied to the operating section 201, the charging section 202 and the external apparatus connecting section 203.

Figure 6:
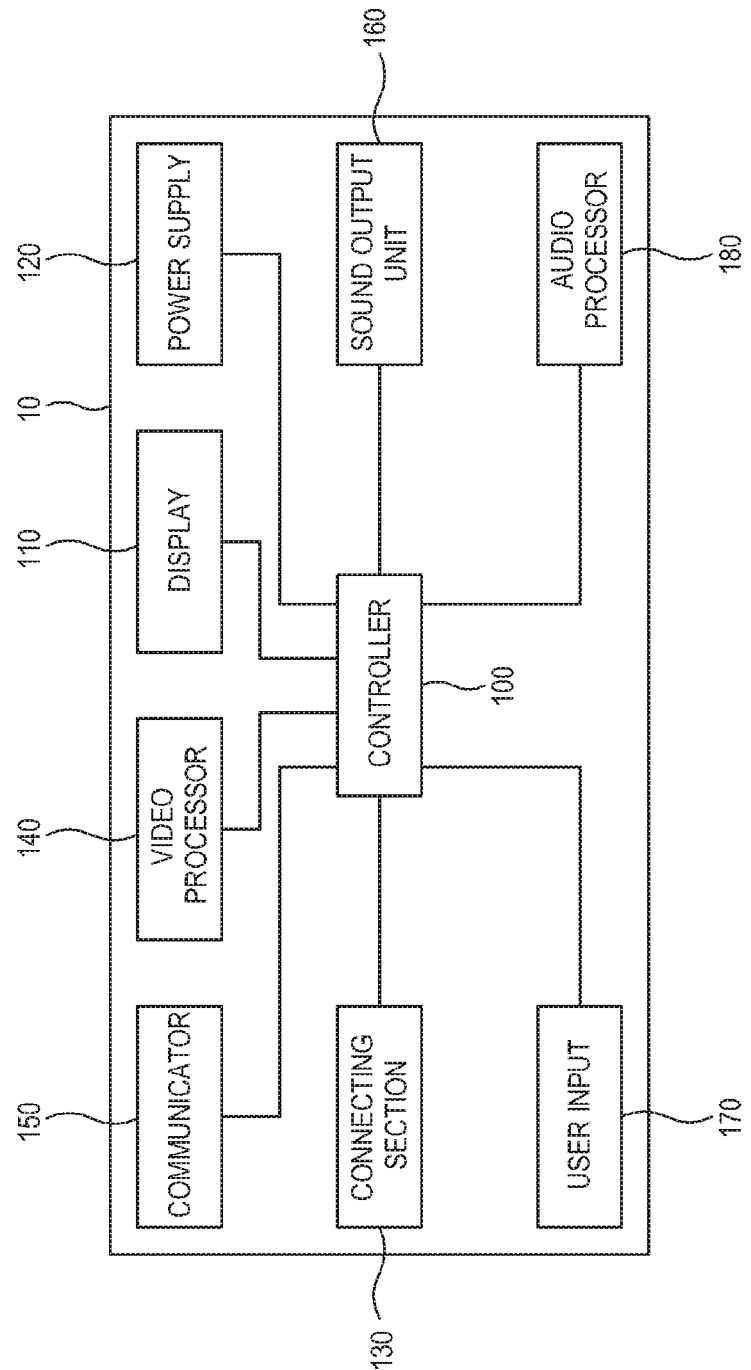
FIG. 6 is a block diagram of a display apparatus according to an exemplary embodiment.

FIG. 3 illustrates that the display apparatus 10 includes the display 102. However, the display apparatus 10 may further include a video processor 140, a communicator 150, a sound output unit 160 (e.g., sound outputter), a user input 170 (e.g., user input interface), an audio processor 180, a controller 100 and the like operating section as shown in FIG. 6.

When the external apparatus 20 is connected to the display apparatus 10 according to an exemplary embodiment, power of 40 W having a voltage of 5V output from the SMPS 101 to the connecting section 103 via the first output power line 104 is supplied to the external apparatus connecting section 203 of the external apparatus 20 through a cable line. When the power 40 W is supplied, power of 20 W is consumed in the operating section 201 for operating the external apparatus 20, and thus the charging section 202 is supplied and charged with the remaining power of 20 W. In the display apparatus 10, the SMPS 101 outputs power having a voltage of 14V to the display 102 through the second output power line 105. A user, who is using the display apparatus 10 according to an exemplary embodiment, views an image through the display 102 set with proper brightness. If the display 102 is not set to the maximum brightness, the power for the maximum brightness is not consumed. For instance, if power needed for the maximum brightness of the display 102 is 30 W and power needed for the brightness set by a user is 20 W, power of 10 W is not consumed in the display 102 but supplied to the transformer 106 via the third output power line 107. The transformer 106 drops the voltage of 14V to the voltage of 5V so that the dropped voltage level can be equal to the voltage level of the first output power. The power of 10 W, of which voltage is dropped to 5V, is supplied to the connecting section 103 and thus supplied to the external apparatus 20. The cable connecting the display apparatus 10 and the external apparatus 20 may include a connecting part having a shape of type C. The connecting sections 203 and 23 and the cable are provided corresponding to one another in the form of a USB type-C and include two pins and lines for supplying power. The power supplied from the display apparatus 10 to the external apparatus 20 may exceed limit capacity of the line of the cable corresponding to the pin of the connecting section 103. For example, when power of certain level is supplied from the third output power line 107 to the pin of the connecting section 103, the supplied power may exceed the limit capacity of the line of the cable and may be higher than the power supplied from the first output power line 104. In this case, it may be difficult to supply sufficient power to the external apparatus 20. Therefore, the first output power line 104 and the third output power line 107 meet at one point, so that the power can be supplied through two pins of the connecting section 103.

When the first output power line 104 is connected to a certain pin of the connecting section 103, the third output power line 107 may be connected to another pin of the connecting section 103. That is, it is possible to supply power from the display apparatus 10 to the external apparatus 20 through different lines of the cable. Since each line of the cable may have a limit, the power can be supplied through the line of the cable as long as it does not reach the limit.

Figure 4:
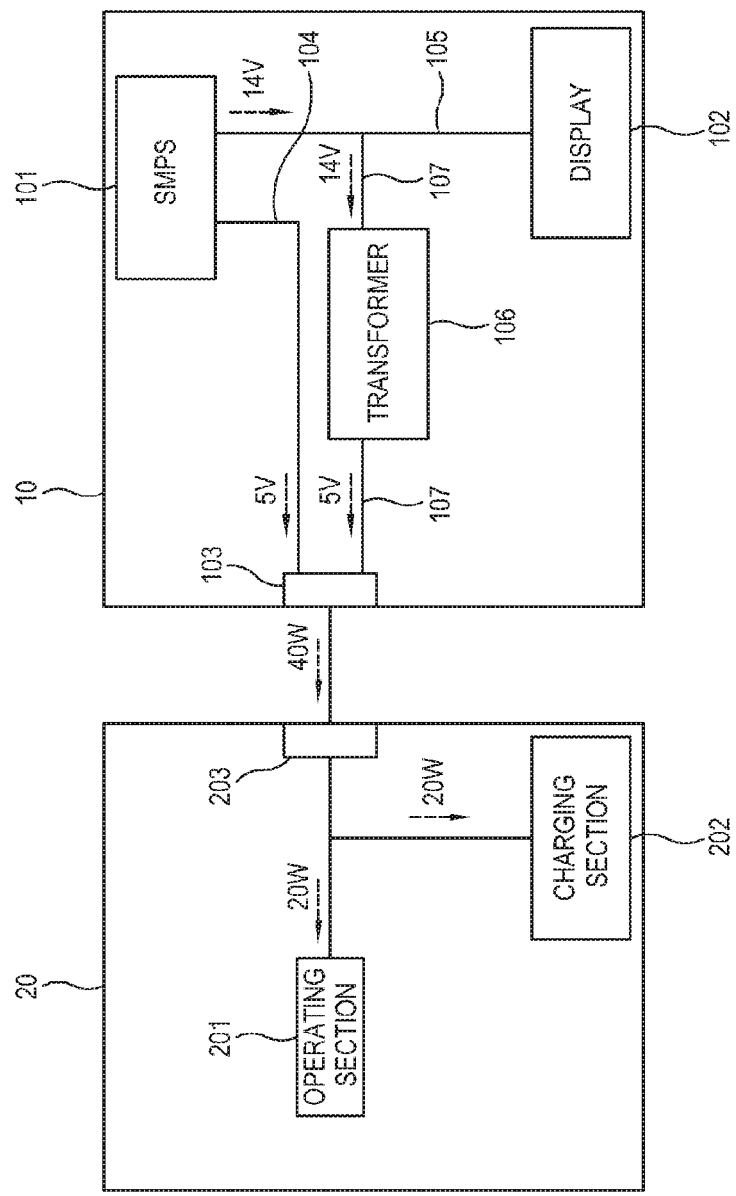

FIG. 4 is a schematic views showing that the display apparatus 10 according to an exemplary embodiment supplies power to the external apparatus 20.

Like the display apparatus 10 of FIG. 3, the display apparatus 10 according to an exemplary embodiment shown in FIG. 4 supplies all but the power needed for the brightness set by a user of the power needed for the maximum brightness of the display 102 to the external apparatus 20. However, if the connecting sections 203 and 23 and the cable are provided corresponding to one another in the form of USB type-C, there are two pins and lines for supplying the power. When the first output power line 104 is connected to a certain pin of the connecting section 103, the third output power line 107 may be connected to another pin of the connecting section 103. That is, it is possible to supply power from the display apparatus 10 to the external apparatus 20 through different lines of the cable. Since each line of the cable may have a limit, the power can be supplied through the line of the cable as long as it does not reach the limit. In addition, the external apparatus 20 may be also provided with a power line so that the power supplied from the third output power line 107 of the display apparatus 10 can be directly supplied to the charging section 202.

Figure 5:
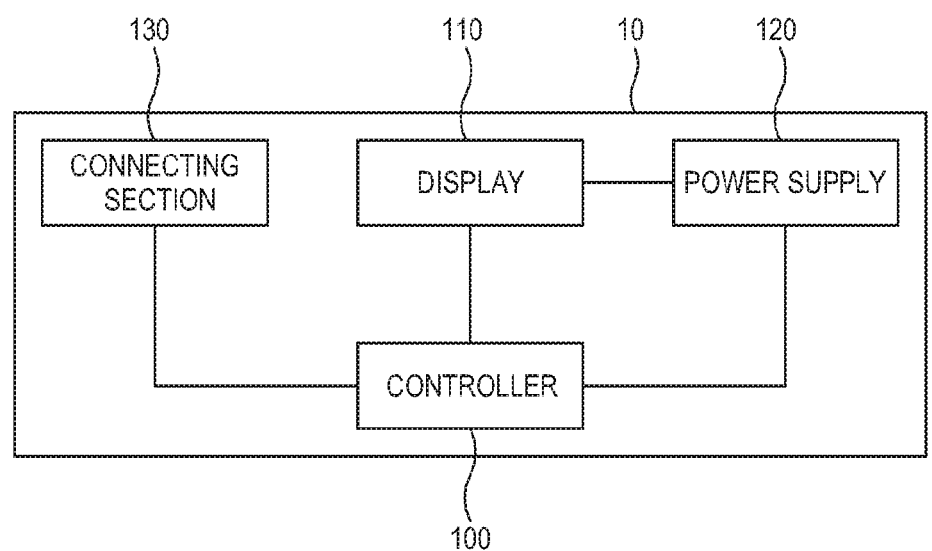
FIG. 5 is a block diagram of a display apparatus according to an exemplary embodiment.

FIG. 5 is a block diagram of a display apparatus according to an exemplary embodiment.

The display apparatus 10 according to an exemplary embodiment includes a display 110, a power supply 120, a connecting section 130 and the controller 100.

The display 110 may display an image based on a video signal output from the video processor (refer to FIG. 6). The display 110 may be variously achieved by liquid crystal, plasma, a light-emitting diode, an organic light-emitting diode, a surface-conduction electron-emitter, a carbon nano-tube, a nano-crystal, etc. without limitations.

The display 110 may include additional elements in accordance with its types. For example, if the display 110 is achieved by the liquid crystal, the display 110 includes a liquid crystal display (LCD) panel, a backlight for illuminating the LCD panel, and a panel driving substrate for driving the LCD panel.

The display 110 displays an image based on a video signal processed by the video processor (refer to FIG. 6). There are no limits to a method of displaying an image on the display 110. For example, the display 110 may be achieved by LCD, PDP, OLED or the like. In each case, the display 110 may include an LCD panel, a PDP panel, an OLED panel, or the like.

The display 110 may display an image and a color calibration process. The display 110 includes a display panel on which an image is displayed, and a panel driver for processing an input video signal to be displayed as an image on the display panel, but not limited thereto. The video signal received from an external input source through the connecting section 130 may be subject to video processing processes such as decoding, deinterlacing, scaling, etc. and then displayed on the display 110.

The power supply 120 is a kind of power supplying apparatus using a switching circuit to supply power to the display apparatus 10, and includes at least one of a rectifying circuit, a smoothing circuit and a constant-voltage circuit. The power supply 120 may supply power having at least two voltage levels to the external apparatus connected to the internal element of the display apparatus 10.

The connecting section 130 exchanges data with an external input source. The external input source includes a graphic card for converting generated data into a video signal and transmitting it to the display apparatus 10, and stores a predetermined graphic card patch for color calibration. The external input source may be a personal computer (PC), but not limited thereto. The connecting section 130 may exchange data with the external input source through digital visual interface (DVI), Component, high definition multimedia interface (HDMI), serial digital interface (SDI) or the like.

The connecting section 130 transmits a signal received through a connector to the controller 100 or the video processor (see FIG. 6), or transmits a signal transmitted from the controller 100 or the video processor (see FIG. 6) to the connector. The connecting section 130 serves for relay, delivery and interface of a signal between the internal elements of the display apparatus 10. The connecting section 130 is separated from the video processor and the controller 100, but not limited thereto. Alternatively, the connecting section may be integrated with or dependent on the video processor (see FIG. 6) or controller 100 in accordance with the types of the display apparatus 10.

In the case in which the connector is based on universal serial bus (USB), the connecting section 130 may be achieved by a USB controller module connected to the connector and controlling a signal transmitted through the connector. Further, the USB may be given in a C-type.

The controller 100 may generally control the internal elements of the display apparatus 10. The controller 100 may receive information about power to be used by at least one operating section 201 (refer to FIGS. 3 and 4) of the external apparatus 20 (refer to FIGS. 3 and 4) connected to the connecting section 130, calculates a level of power to be supplied to the external apparatus 20 (refer to FIGS. 3 and 4) so that the charging section 202 (refer to FIGS. 3 and 4) can be charged based on the power information and the usage power of the display 110, and controls the power supply 120 so that the power having the calculated level can be supplied to the external apparatus 20 (refer to FIGS. 3 and 4).

FIG. 6 is a block diagram of the display apparatus 10 according to an exemplary embodiment.

The display apparatus 10 according to an exemplary embodiment includes the display 110, the power supply 120, the connecting section 130, the video processor 140, the communicator 150, the sound output unit 160, the user input 170, the audio processor 180 and the controller 100.

The display 110 may display an image based on a video signal output from the video processor 140. The display 110 may be variously achieved by liquid crystal, plasma, a light-emitting diode, an organic light-emitting diode, a surface-conduction electron-emitter, a carbon nano-tube, a nano-crystal, etc. without limitations.

The display 110 may include additional elements in accordance with its types. For example, if the display 110 is achieved by the liquid crystal, the display 110 includes a liquid crystal display (LCD) panel, a backlight for illuminating the LCD panel, and a panel driving substrate for driving the LCD panel.

The display 110 displays an image based on a video signal processed by the video processor (refer to FIG. 6). There are no limits to a method of displaying an image on the display 110. For example, the display 110 may be achieved by LCD, PDP, OLED or the like. In each case, the display 110 may include an LCD panel, a PDP panel, an OLED panel, or the like.

The display 110 may display an image and a color calibration process. The display 110 includes a display panel on which an image is displayed, and a panel driver for processing an input video signal to be displayed as an image on the display panel, but not limited thereto. The video signal received from an external input source through the connecting section 130 may be subject to video processing processes such as decoding, deinterlacing, scaling, etc. and then displayed on the display 110.

The power supply 120 is a kind of power supplying apparatus using a switching circuit to supply power to the display apparatus 10, and includes at least one of a rectifying circuit, a smoothing circuit and a constant-voltage circuit. The power supply 120 may supply power having at least two voltage levels to the external apparatus connected to the internal element of the display apparatus 10.

The connecting section 130 exchanges data with an external input source. The external input source includes a graphic card for converting generated data into a video signal and transmitting it to the display apparatus 10, and stores a predetermined graphic card patch for color calibration. The external input source may be a personal computer (PC), but not limited thereto. The connecting section 130 may exchange data with the external input source through digital visual interface (DVI), Component, high definition multimedia interface (HDMI), serial digital interface (SDI) or the like.

The connecting section 130 transmits a signal received through a connector to the controller 100 or the video processor 140, or transmits a signal transmitted from the controller 100 or the video processor 140 to the connector. The connecting section 130 serves for relay, delivery and interface of a signal between the internal elements of the display apparatus 10. According to an exemplary embodiment, the connecting section 130 is separated from the video processor and the controller 100, but not limited thereto. Alternatively, the connecting section may be integrated with or dependent on the video processor 140 or controller 100 in accordance with the types of the display apparatus 10.

In the case in which the connector is based on universal serial bus (USB), the connecting section 130 may be achieved by a USB controller module connected to the connector and controlling a signal transmitted through the connector. Further, the USB may be given in a C-type.

There are no limits to the kind of image processing process performed by the video processor 140, and the video processing process may for example include demultiplexing for separating a predetermined signal into signals corresponding to characteristics, decoding corresponding to video formats of a video signal, de-interlacing for converting a video signal from an interlaced type into a progressive type, noise reduction for improving image quality, detail enhancement, frame refresh rate conversion, etc. Further, the video processor 140 may include a decoder for decoding a source image corresponding to video formats of an encoded source image, and a frame buffer for storing the decoded source image in units of frame.

The video processor 140 may be achieved by a system-on-chip in which various functions are integrated, or by an image processing board on which individual elements capable of independently performing these processes are mounted on to a printed circuit board, and may be built-in the display apparatus 10.

The video processor 140 applies various video processing processes to a broadcast signal including a video signal received from the communicator 150 and a source image including a video signal received from an image source. The video processor 140 outputs the processed video signal to the display apparatus 10, thereby displaying the processed source image.

The communicator 150 receives a signal due to an external input and transmits it to the video processor 140 or controller 100. The communicator 150 may connect with various external input cables to receive a signal from the corresponding external input by a wire, or may receive a signal wirelessly through reset wireless communication standards.

The communicator 150 may include a plurality of connectors to which the cables are respectively connected. The communicator may receive a signal from a connected external input, for example, a broadcast signal, a video signal, a data signal, etc. based on the HDMI, USB, Component standards, or receive communication data through a communication network.

The communicator 150 may include not only an element for receiving a signal/data from an external input, but also various additional elements such as a wireless communication module for wireless communication, a tuner for receiving a broadcast signal, etc. in accordance with designs of the display apparatus 10. The communicator 150 not only receives a signal from the external apparatus, but also transmits information/data/signal of the display apparatus 10 to the external apparatus. That is, the communicator is not limited to the element for receiving a signal from the external apparatus, and may be achieved by an interface for interactive communication. The communicator 150 may receive a control signal for selecting a UI from a plurality of control devices. The communicator 150 may include communication modules for publicly known near-field wireless communication such as Bluetooth, infrared (IR), Ultra Wideband (UWB), Zigbee, or may include publicly known communication port for wired communication. The communicator 150 may be used for various purposes of transmitting/receiving a command, data, etc. for controlling the display as well as a control signal for selecting the UI.

The sound output unit 160 may be achieved by a loudspeaker. A volume level of a sound may be controlled by the controller 100 so that the sound can be output with the controlled volume.

The user input 170 may send the controller 100 various preset control command or information in accordance with a user's control and input. The user input 170 may be achieved by a menu key or input panel provided outside the display apparatus 10, a remote controller separated from the display apparatus 10, or the like. Further, the user input 170 may be provided integrally with the display 110. For example, if the display 110 is a touch screen, a user may touch an input menu displayed on the display 110 so that a preset command can be transmitted to the controller 100.

The user input 170 may receive a user's motion and voice. A user's motion may include a touch input. The user input 170 may directly receive a user's motion and voice, or may receive information about a user's motion and voice from the external apparatus.

The audio processor 180 may perform a process related to voice/sound input to the communicator 150, among various preset processes performed in the display apparatus 10. Here, "voice" to be processed by the audio processor 180 refers to voice input to the communicator 150. When the video processor 140 processes an image signal, this image signal may involve audio data. Therefore, audio data involved in the video signal may be processed by the video processor 140.

When voice/sound is input to the communicator 150, the audio processor 180 determines whether the input voice/sound is uttered by a user or made from other causes. This determination may be achieved by various structures. For example, it may be determined whether the input voice/sound has a wavelength/frequency band of a human, or whether the input voice/sound is matched with a voice profile of a previously designated user.

If it is determined that utterance is given by a user, the audio processor 180 processes a preset operation to be performed in response to a voice command corresponding to the utterance. Here, the voice command may refer to words spoken by a user.

The controller 100 may make a request for information about the maximum usable power of the external apparatus to the external apparatus, and receive the information.

The controller 100 may calculate the level of the power based on at least one of image quality information about image display of the external apparatus, sound information and driving rate information about the operating section 201 (see FIGS. 3 and 4) in the external apparatus (see FIGS. 3 and 4).

The controller 100 may calculate the level of the power based on at least one of image quality information of the display 110, the sound information of the sound output unit 160, and the driving rate information of the display apparatus 10.

Here, the power supply 120 may include a first output power line through which first output power is output, and a second output power line through which second output power different from the first output power is output.

Further, at least one line between the first output power line and the second output power line may be connected to the connecting section 130, and the other one may be connected to the display 110.

A voltage corresponding to the external apparatus 20 (see FIGS. 3 and 4) is output through the first output power line, and a voltage of the second output power may be higher than the voltage of the first output power.

The display apparatus 10 may further include a power regulator 200 (see FIG. 11) for regulating the level of the power output from the power supply 120, and the power regulator 200 (see FIG. 11) may be arranged in between the power supply 120 and the connecting section 130.

In addition, a third output power line 123 (see FIG. 11) may be branched from a point of the output line between the power supply 120 and the display 110, so that the power supply 120 can connect with the connecting section 130 from the branched point.

Further, a transformer 190 (see FIG. 11) may be provided to adjust the voltage output from the power supply 120, and the transformer 190 (see FIG. 11) is arranged on the third output power line.

The transformer 190 (see FIG. 11) may be further provided for transforming the voltage output from the power supply 120, be branched from one point on the output line between the power supply 120 and the display 110. The transformer 190 (see FIG. 11) may be arranged on the third output power line between the branched point and the power regulator 200 (see FIG. 11).

The transformer 190 (see FIG. 11) may be arranged on the third output power line between the branched point and the connecting section 130.

A switching section 124 (see FIG. 11) may be further provided for selectively connecting the branched point and the transformer 190 (see FIG. 11), and the controller 100 may control the switching section 124 (see FIG. 11) so that the branched point can be connected to the transformer when the usage power of the display 110 is lower than the maximum usable power.

Figure 7:
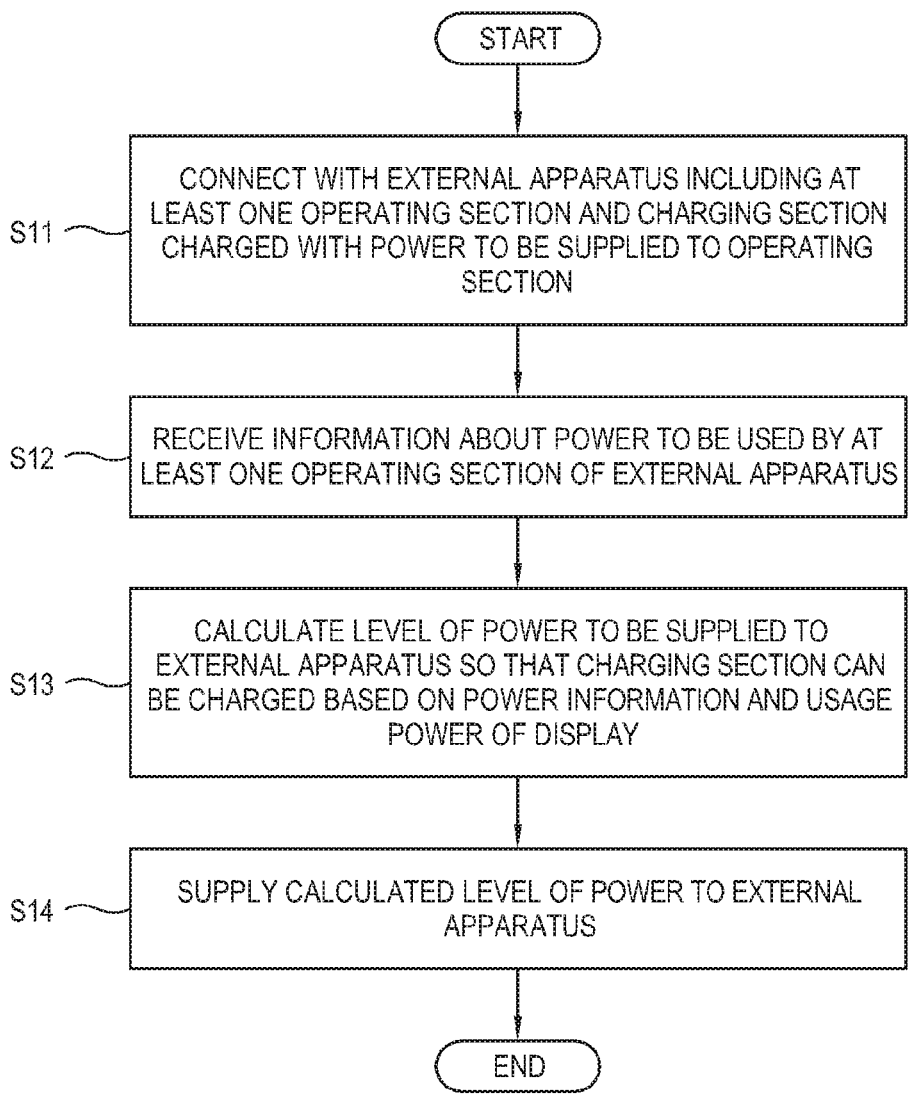
FIG. 7 is a control flowchart showing operations of the display apparatus according to an exemplary embodiment.

FIG. 7 is a control flowchart showing operations of the display apparatus 10 according to an exemplary embodiment.

The display apparatus 10 connects with the external apparatus including at least one operating section 201 (see FIGS. 3 and 4) and the charging section 202 (see FIGS. 3 and 4) to be charged with power to be supplied to the operating section 201 (see FIGS. 3 and 4) (S11).

Information about power to be used by at least one operating section 201 (see FIGS. 3 and 4) of the external apparatus 20 (see FIGS. 3 and 4) is received (S12).

The level of the power to be supplied to the external apparatus 20 (see FIGS. 3 and 4) so as to charge the charging section 202 (see FIGS. 3 and 4) is calculated based on the power information and the usage power of the display 110 (S13).

The calculated level of the power is supplied to the external apparatus 20 (S14)(see FIGS. 3 and 4).

Figure 8:
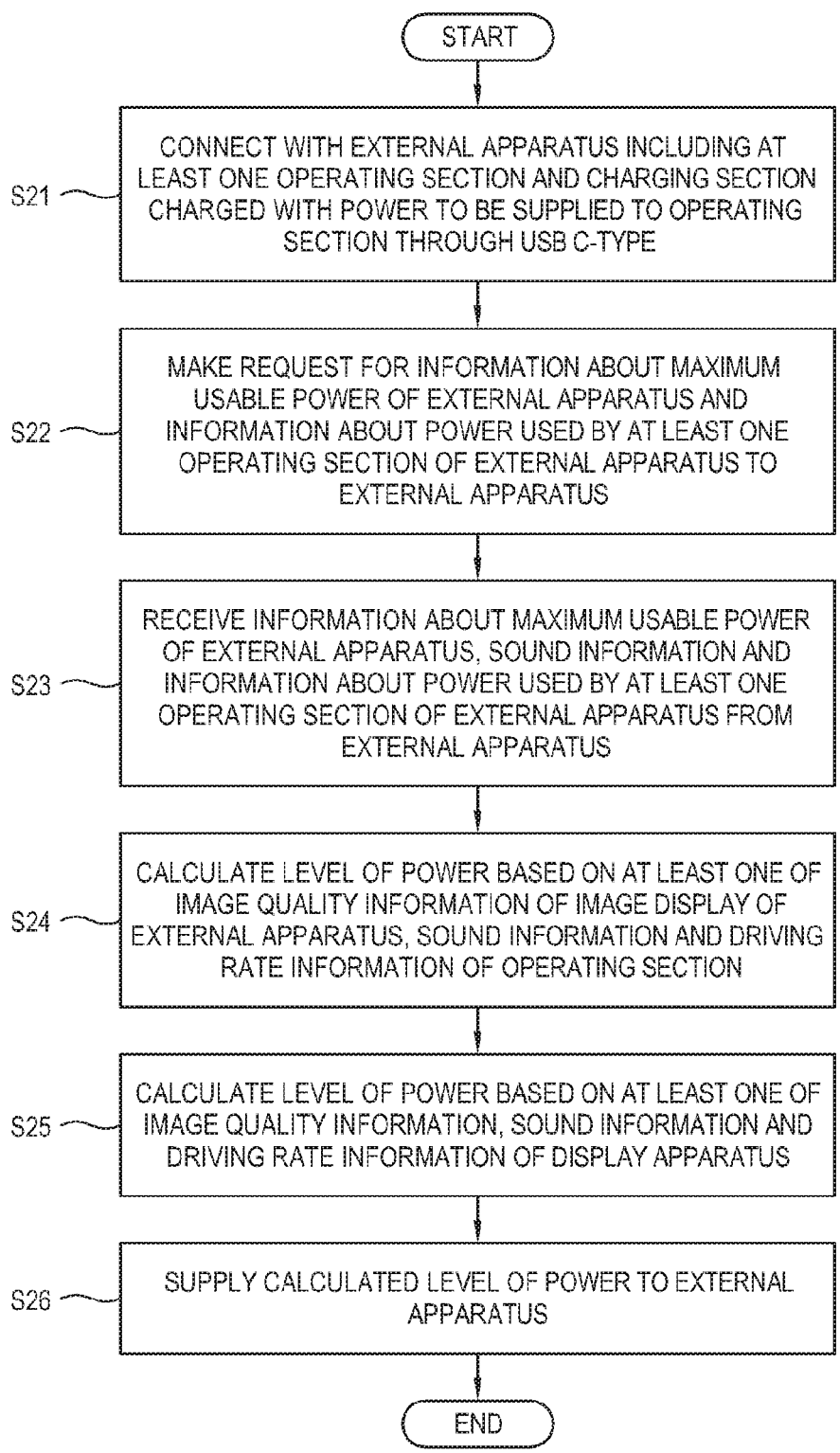
FIG. 8 is a control flowchart showing operations of the display apparatus according to an exemplary embodiment.

FIG. 8 is a control flowchart showing operations of the display apparatus 10 according to an exemplary embodiment.

The display apparatus 10 connects with the external apparatus 20 (see FIGS. 3 and 4), which includes at least one operating section 201 (see FIGS. 3 and 4) and the charging section 202 (see FIGS. 3 and 4) to be charged with the power to be supplied to the operating section 201 (see FIGS. 3 and 4), by a cable of a USB type-C (S21).

A request for the maximum usable power information of the external apparatus 20 (see FIGS. 3 and 4) and information about the power to be used by at least one operating section 201 (see FIGS. 3 and 4) is made to the external apparatus 20 (see FIGS. 3 and 4) (S22).

In response to the request, the maximum usable power information of the external apparatus 20 (see FIGS. 3 and 4) and information about the power to be used by at least one operating section 201 (see FIGS. 3 and 4) are received from the external apparatus 20 (see FIGS. 3 and 4) (S23). The maximum usable power information and the power information may include information about the image quality, sound and driving rate of the operating section in the external apparatus 20 (see FIGS. 3 and 4).

The level of the power is calculated based on at least one among the image quality information about the image display in the external apparatus 20 (see FIGS. 3 and 4), the sound information and the driving rate information of the operating section 201 (see FIGS. 3 and 4) (S24).

The level of the power is calculated based on at least one among the image quality information of the display 110, the sound information of the sound output unit and the driving rate information of the display apparatus 10 (S25).

The calculated level of the power is supplied to the external apparatus 20 (see FIGS. 3 and 4) (S26).

Figure 9:
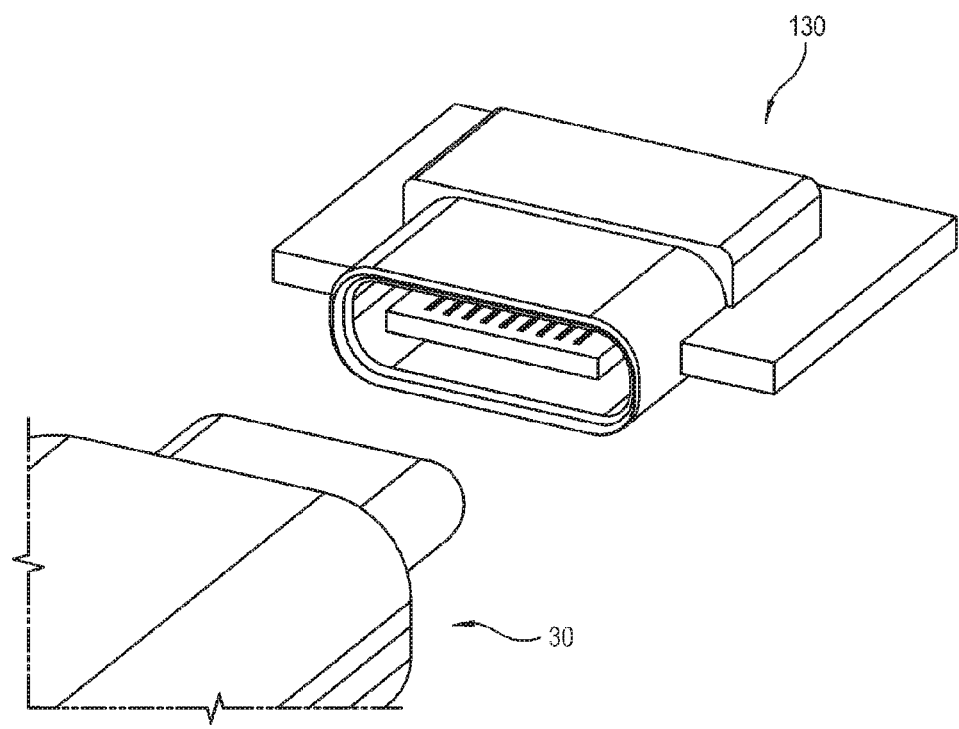
FIG. 9 is a schematic view showing a connecting section of display apparatus according to an exemplary embodiment and a connection cable.

FIG. 9 is a schematic view showing a connecting section 130 of display apparatus 10 according to an exemplary embodiment and a connection cable 30.

FIG. 9 shows the USB type-C. The USB type-A and B are not symmetrical with respect to up and down or left and right directions, and thus needed to check up and down or left and right directions thereof when they are inserted in the port. On the other hand, the USB type-C is very convenient since it is symmetrical with respect to the up, down, left and right directions and two pins are symmetrically provided for transferring data and power. Further, the USB 3.1 type-C increases a data signaling rate to 10 Gbit/s and transfer up to 100 W of power.

Figure 10:
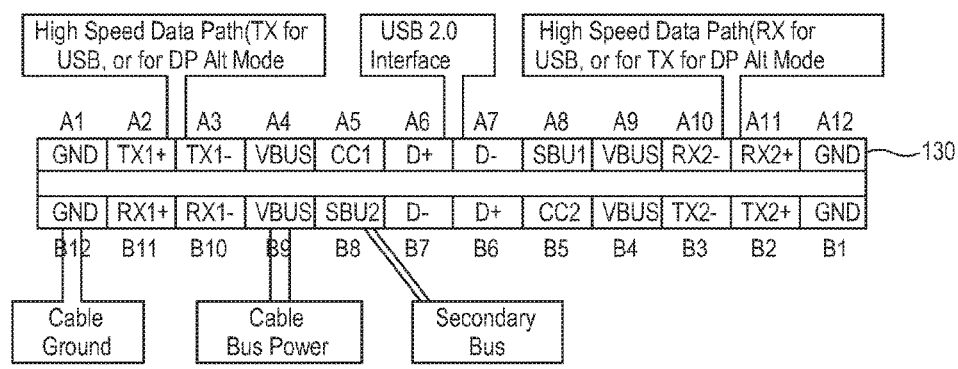
FIG. 10 is a view for explaining detailed functions of pins in the connecting section of the display apparatus according to an exemplary embodiment.

FIG. 10 is a view for explaining detailed functions of pins in the connecting section 130 of the display apparatus 10 according to an exemplary embodiment.

As shown in FIG. 10, the USB 3.1 type-C has four lines for transferring data and four lines for receiving data so that a plurality of control signals and massive video data can be quickly transmitted and received. Further, bus power cables are symmetrically provided in the A4 line and the A9 line, so that the display apparatus 10 can use both the lines to supply power to the external apparatus 20 (see FIGS. 3 and 4) when the display apparatus 10 and the external apparatus 20 (see FIGS. 3 and 4) are connected by the cable 30 of the USB type-C. A voltage to be supplied is selectable among 5V, 12V and 20V, and power of 100 W is transferrable with the maximum current of 5 A. In addition, the cable 30 of the USB type-C supports bidirectional distribution.

FIG. 9 and FIG. 10 show that the display apparatus and the external apparatus 20 (see FIGS. 3 and 4) are connected by the cable 30 of the USB type-C, but not limited thereto. It will be preferable that the cable transfers the power as high as possible.

Figure 11:
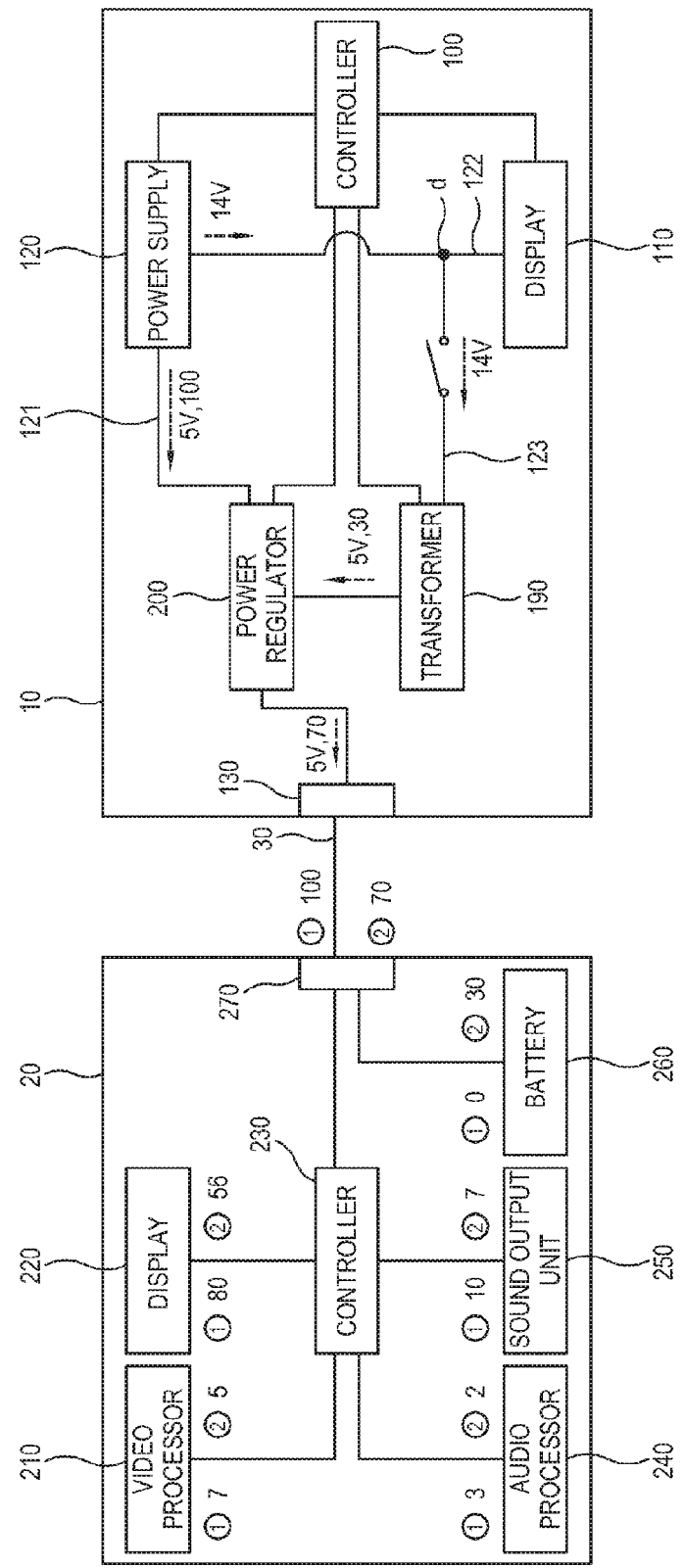
FIGS. 11 and 12 are views showing examples of supplying power from the display apparatus according to an exemplary embodiment to the external apparatus.

FIG. 11 illustrates that the display apparatus 10 according to an exemplary embodiment supplies power to the external apparatus 20.

The display apparatus 10 according to an exemplary embodiment includes the display 110, the power supply 120, the connecting section 130, the transformer 190, the power regulator 200, the first output power line 121, the second output power line 122, the third output power line 123 and the controller 100. The external apparatus 20 connected to the display apparatus 10 according to an exemplary embodiment includes the video processor 210, the display 220, the controller 230, the audio processor 240, the sound output unit 250, the battery the charging section 260, the external apparatus connecting section 270 and the lines for connecting theses operating sections.

The display apparatus 10 of FIG. 11 representatively shows the display 110, but may further include the operating sections such as the video processor 140, the communicator 150, the sound output unit 160, the user input 170 and the audio processor 180 as shown in FIG. 6.

When the external apparatus 20 is connected to the display apparatus 10, the display apparatus 10 transmits a control signal of making a request for the maximum usable power information of the external apparatus 20 to the external apparatus 20. If the information about the maximum usable power (30 W) of the external apparatus 20 is received in response to the request, the level of the power to be supplied to the external apparatus 20 is calculated as a voltage corresponding to the external apparatus 20. Under control of the controller 100, the power supply 120 supplies the power of 30 W having a voltage of 5V to the external apparatus 20 via the first output power line 121 and the connecting section 130. If the external apparatus 20 is a notebook computer, a user can use the notebook computer to view an image. Many users do not set the display 220 of the external apparatus 20 to the maximum brightness in order to protect his/her eyesight and view a vivid image. For example, the display 220 may be set by about 70% of the maximum brightness. The display 220 of the external apparatus 20 may operate to have brightness set by a user with about 70% of the power. As shown in FIG. 11, ① the maximum usable power and ② the currently used power are marked in each operating section. In the case of the video processor 210, its maximum usable power is 7% of total power, but 5% of total power is currently consumed. Likewise, the maximum usable power of the audio processor 240 is 3% of total power, but 2% of total power is currently consumed in the audio processor 240. The maximum usable power of the sound output unit 250 is 10% of total power, but 7% of total power is currently consumed in the sound output unit 250. Consequently, only 21 W is consumed by the operating section within the power of 30 W (100%) supplied from the display apparatus 10. If a battery (i.e., the charging section, 260) is not charged by 100%, 9 W (30%) is supplied to and charged in the battery (i.e., the charging section, 260).

When the battery (i.e., the charging section, 260) of the external apparatus 20 is completely charged, the display apparatus 10 may receive a signal corresponding to the charging completion of the battery (i.e., the charging section, 260) from the external apparatus 20. Thus, the display apparatus 10 may make a request for information about the usage power currently needed for normally driving the external apparatus 20 to the external apparatus 20. By receiving the information about the usage power currently needed for normally driving the external apparatus 20 from the external apparatus 20, the controller 100 controls the power regulator 200 so that the power corresponding to the information about the usage power currently needed for normally driving the external apparatus 20 can be transmitted to the external apparatus 20. For example, if the usage power currently needed for normally driving the external apparatus 20 is 20 W and the power currently supplied to the external apparatus 20 is 30 W equal to the maximum usable power, the controller 100 controls the power regulator 200 so that the power of 20 W can be supplied through the connecting section 130. Accordingly, it is possible to calculate the level of the power to be supplied to the external apparatus 20 based on the received power information of the external apparatus 20, thereby supplying the power having the calculated level to the external apparatus 20.

The power supply 120 of the display apparatus 10 supplies the usage power having a voltage of 14V to the display 110 through the second output power line 122. If a user of the display apparatus 10 does not set the display 110 up to the maximum brightness, the power supplied from the power supply 120 is not entirely consumed in the display 110. If the power not consumed in the display 110 is supplied to the external apparatus 20 when the external apparatus 20 is connected to the display apparatus in order to charge the battery (i.e., the charging section, 260), the battery (i.e., the charging section, 260) may be more quickly charged.

As shown in FIG. 11, the display apparatus 10 is formed with the third output power line 123 branched from one point of the second output power line 122 for connecting the power supply 120 and the display 110. The third output power line 123 is connected to the power regulator 200, and the transformer 190 for transforming the power having the voltage level of 14V to be supplied to the display 110 into the power having the voltage level of 5V is arranged on the third output power line 123. For example, the transformer 190 transforms the power of 14V and 10 W into power of 5V and 10 W. The power output from the transformer 190 is transferred to the power regulator 200. At this time, the lines of the connecting section 130 are assigned in accordance with the levels of the power, thereby supplying the power to the external apparatus 20. The power regulator 200 may regulate the power in accordance with the power needed for the external apparatus 20. For example, if the battery 260 of the external apparatus 20 is fully charged and thus there may be no need for the power for the charging, the power is regulated so that only the power currently used by the external apparatus 20 can be supplied.

Figure 12:
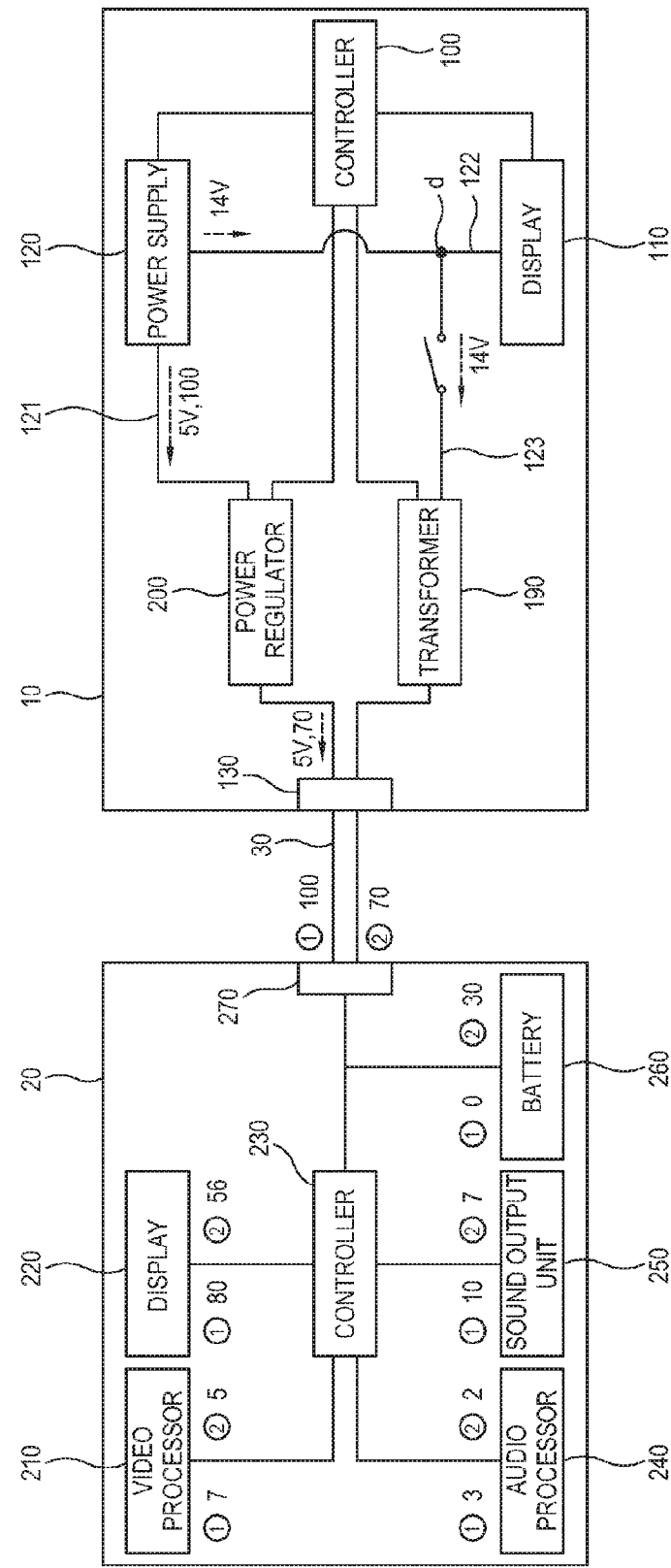

FIG. 12 illustrates that the power is supplied from the display apparatus 10 according to an exemplary embodiment to the external apparatus.

The display apparatus 10 of FIG. 12 has the same structure as that of FIG. 11 except that the transformer 190 on the third output power line 123 is directly connected to the connecting section 130 without passing through the power regulator 200. Since the power not consumed in the display 110 is used in charging the battery 260 of the external apparatus 20, the connecting section 130 can be directly connected to the battery 260 of the external apparatus 20 through the connecting section 270 of the external apparatus 20. Therefore, when the external apparatus 20 is connected to the display apparatus 10, some of the total power supplied to the display 110 may be directly supplied to the battery 260 of the external apparatus 20. Further, the power output from the transformer 190 and the power output from the power supply 120 may be joined in the connecting section 130. In addition, the power output from the transformer 190 and the power output from the power supply 120 may be connected by the respective power lines of the connecting section 130 so that the power can be supplied to the external apparatus 20.

Figure 13:
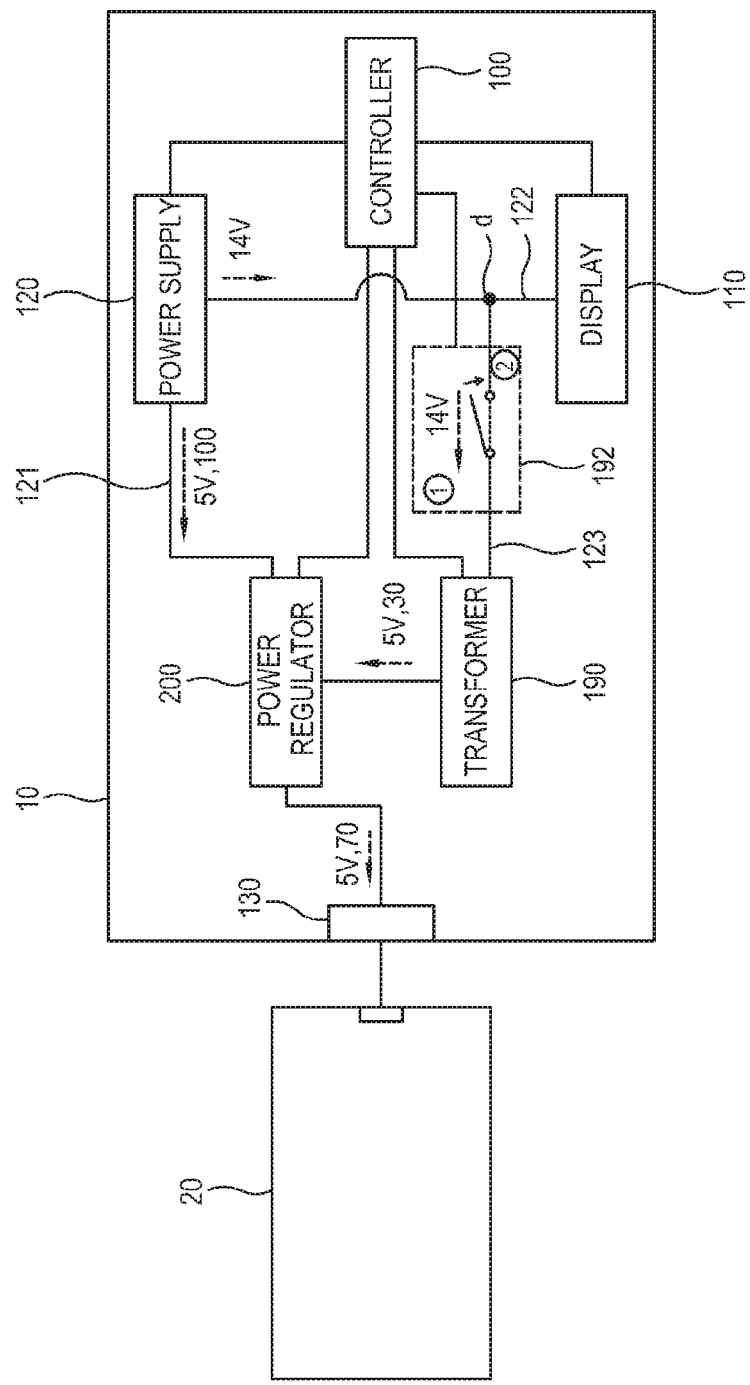
FIGS. 13 and 14 are views showing operations of the display apparatus according to an exemplary embodiment.

FIG. 13 illustrates operations of the display apparatus 10 according to an exemplary embodiment.

The display apparatus 10 according to an exemplary embodiment includes the display 10, the power supply 120, the connecting section 130, the transformer 190, the power regulator 200, the first output power line 121, the second output power line 122, the third output power line 123, the switching section 192 and the controller 100. The display apparatus 10 of FIG. 13 representatively shows the display 110, but may further include the operating sections such as the video processor 140, the communicator 150, the sound output unit 160, the user input 170 and the audio processor 180 as shown in FIG. 6.

As shown in FIG. 13, the display apparatus 10 is formed with the third output power line 123 branched from one point of the second output power line 122 for connecting the power supply 120 and the display 110. The third output power line 123 is connected to the power regulator 200, and the transformer 190 for transforming the power having the voltage level of 14V be supplied to the display 110 into the power having the voltage level of 5V is arranged on the third output power line 123. For example, the transformer 190 transforms the power of 14V and 10 W into power of 5V and 10 W. The power output from the transformer 190 is transferred to the power regulator 200. At this time, the lines of the connecting section 130 are assigned in accordance with the levels of the power, thereby supplying the power to the external apparatus 20. The power regulator 200 may regulate the power in accordance with the power needed for the external apparatus 20. For example, if the battery 260 of the external apparatus 20 is fully charged and thus there may be no need for the power for the charging, the power is regulated so that only the power currently used by the external apparatus 20 can be supplied. If the external apparatus 2, which needs to be charged, is connected to the display apparatus 10, the setting information for the operating section such as the display 110 in the display apparatus 10 is checked. If it is checked that the information about the currently used power (②14V, 70%) of the display 110 is not the settings for the brightness or the like using the maximum usable power (①14V, 100%), the switching section 192 is operated (②) to selectively connect the branched point d and the transformer 190, so that some power (14V 30%) of the power having the voltage of 14V not consumed in the display 110 is input to the transformer 190.

Figure 14:
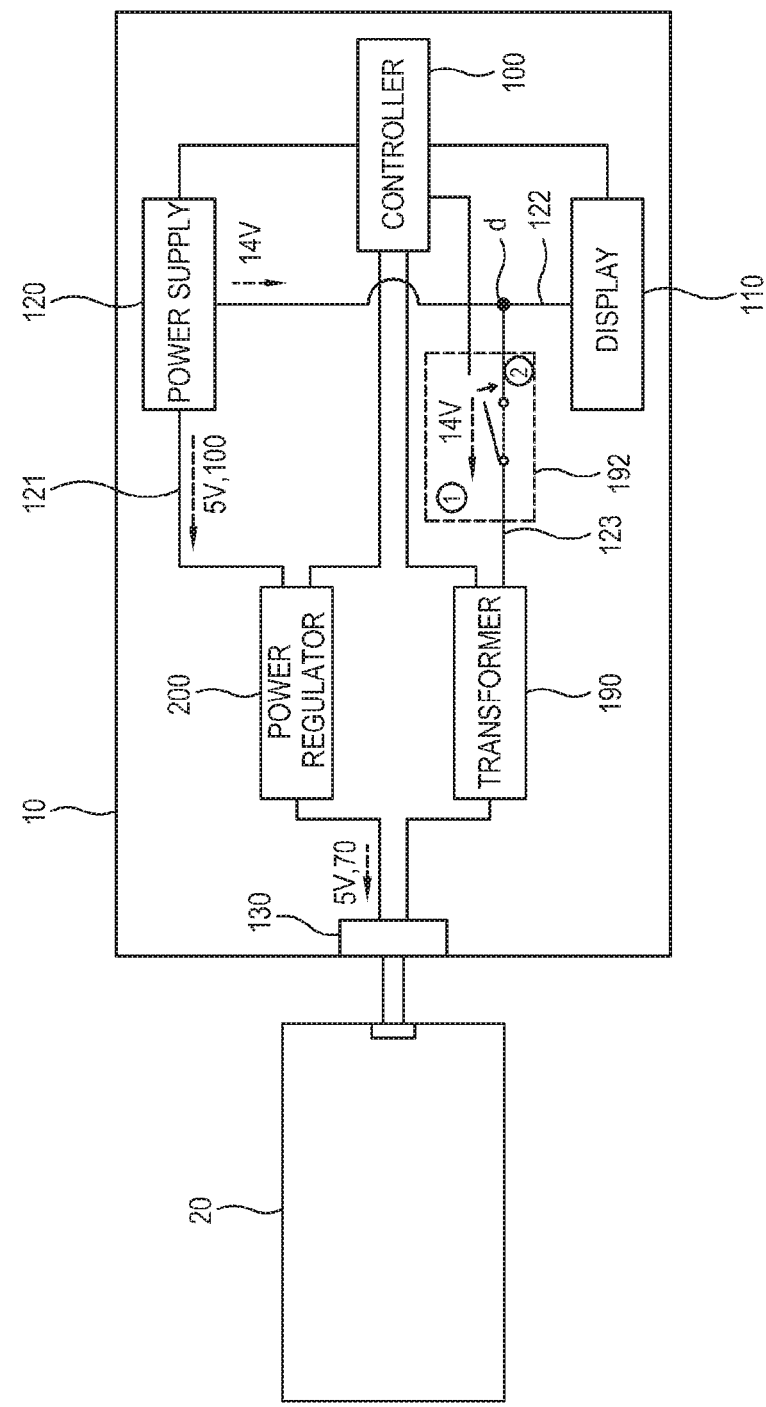

FIG. 14 illustrates operations of the display apparatus 10 according to an exemplary embodiment.

The display apparatus 10 FIG. 14 is the same as the display apparatus 10 of FIG. 13 except the power output from the transformer 190 on the third output power line 123 is directly connected to the connecting section 130 without passing through the power regulator 200. Since the power not consumed in the display 110 may be needed for charging the battery 260 of the external apparatus 20, the connecting section 130 can be directly connected to the battery 260 of the external apparatus 20 through the connecting section 270 of the external apparatus 20. Therefore, when the external apparatus 20 is connected to the display apparatus 10, some of the total power supplied to the display 110 may be directly supplied to the battery 260 of the external apparatus 20. Further, the power output from the transformer 190 and the power output from the power supply 120 may be joined in the connecting section 130. In addition, the power output from the transformer 190 and the power output from the power supply 120 may be connected by the respective power lines of the connecting section 130 so that the power can be supplied to the external apparatus 20.

Figure 15:
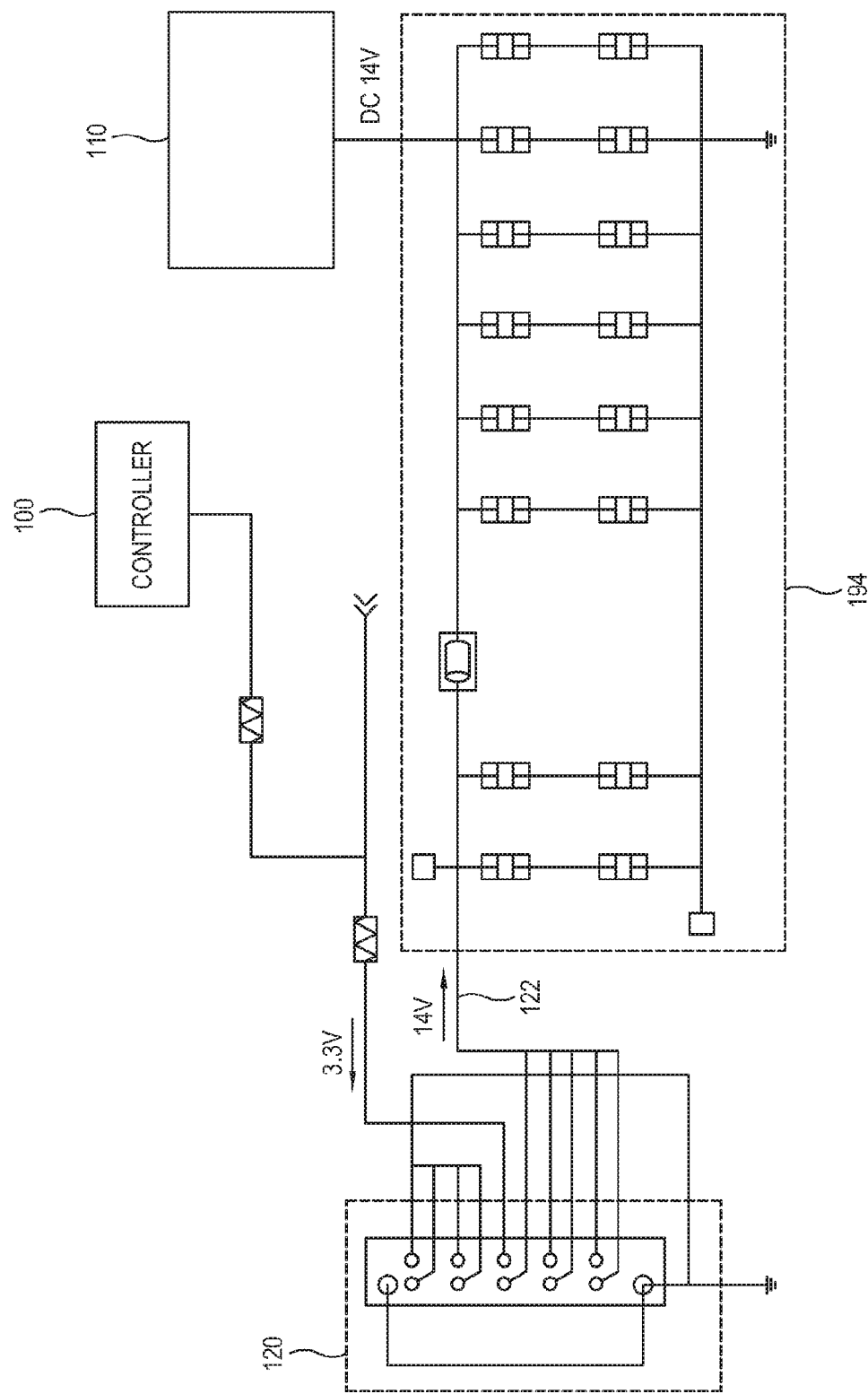
FIG. 15 is a power circuit diagram showing that the display apparatus according to an exemplary embodiment supplies the power.

FIG. 15 is a power circuit diagram showing that the display apparatus 10 according to an exemplary embodiment supplies the power.

A power line is formed so that power of 3.3V can be supplied from the controller 100 to the power supply 120. When the display apparatus 10 is first driven, a control signal together with the voltage of 3.3V is supplied from the controller 100 to the power supply 120, and thus the power supply 120 stars operating in response to the signal from the controller 100. The power supply 120 supplies the power having the voltage of 14V to the display 110 through the second output power line 122. At this time, the power passes through a power stabilizer 194 for stabilizing the power and is then supplied as the voltage of 14V to the display 110.

Figure 16:
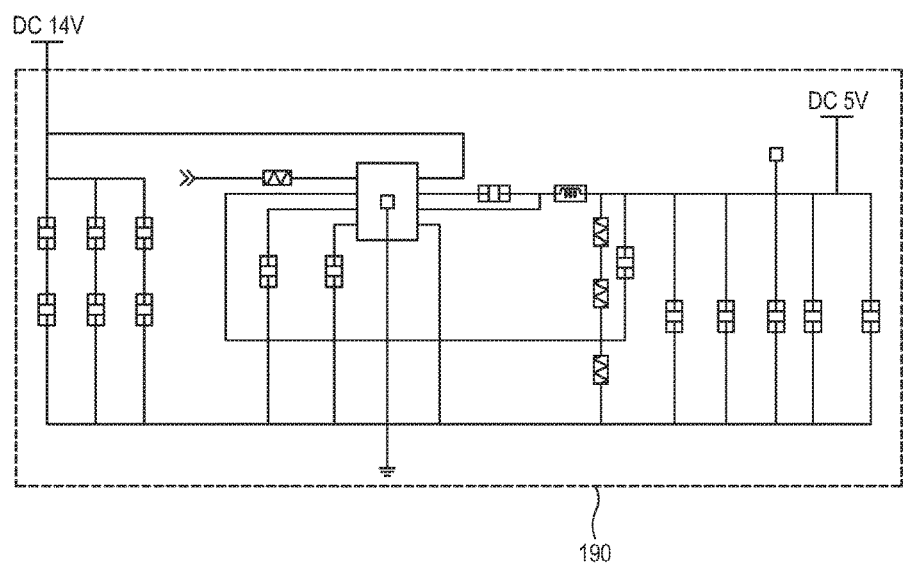
FIG. 16 is a circuit diagram showing details of a transformer in the display apparatus according to an exemplary embodiment.

FIG. 16 is a circuit diagram showing details of the transformer 160 in the display apparatus 10 according to an exemplary embodiment.

The power having the voltage of 14V for the operating section such as the display 110 in the display apparatus 10 is transformed into power having a voltage of 5V. Thus, the voltage is dropped from 14V to 5V while the power is maintained.

FIG. 17 is a table showing chargeable values with regard to brightness information of the display apparatus 10 according to an exemplary embodiment and brightness information of the external apparatus.

FIG. 17 shows a ratio of power with respect to the brightness of the display 110 and the brightness of the external apparatus, i.e., the notebook computer 20. The brighter the display 110 and the external apparatus, i.e., the notebook computer 20, are, the more the power is consumed. Therefore, the remaining power for charging is decreased in inverse proportion to the brightness of the display 110 and the external apparatus, i.e., the notebook computer 20. For example, if a monitor has a brightness of 100 (e.g., the maximum brightness), the charging is not performed since the remaining power for charging is 0. If the monitor has a brightness of 50 (e.g., about 50% brightness of the maximum brightness), the remaining power for charging is 50 (for instance, if the power for the maximum brightness is 20 W, 10 W corresponding to 50% can be used for the charging).

Referring to this table, it is possible to calculate the maximum charging power. For example, MAX Charging Current=USB 5V DCDC Max current*([Monitor Brightness charging value+Notebook Brightness charging value]/2)*1/100.

Figure 18:
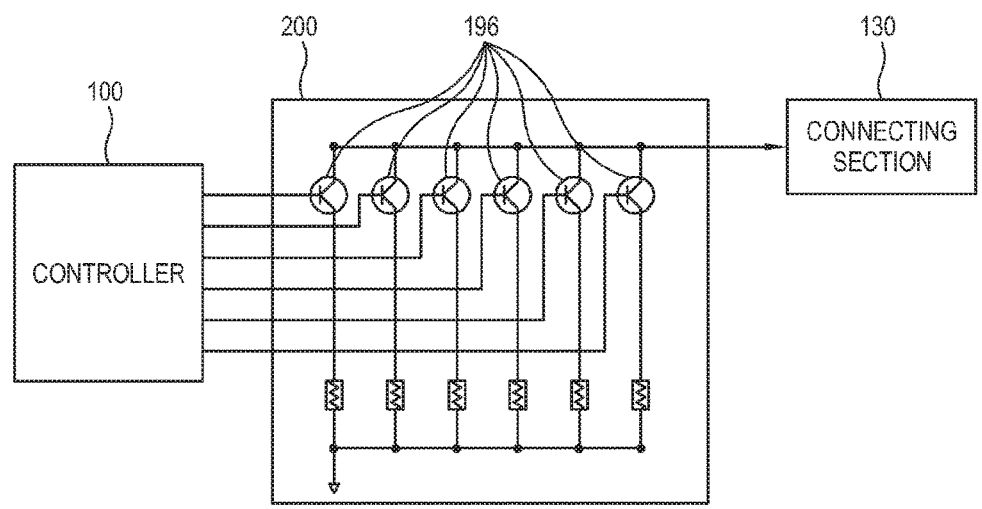
FIG. 18 is a circuit diagram showing details of a power regulator of the display apparatus according to an exemplary embodiment.

FIG. 18 is a circuit diagram showing details of the power regulator 200 of the display apparatus 120 according to an exemplary embodiment.

The power regulator 200 includes a plurality of output power lines. The plurality of output power lines are provided with switches 196 to be turned on/off in accordance with time. These switches 196 are turned on and off under control of the controller 100. For example, the switch 196 is turned on by the current brightness level with respect to the maximum brightness of the display 110, and thus time of supplying power to the external apparatus 2 through the connecting section 120 is varied. Like this, the controller 100 controls the switch 196 in accordance with the current sound output level of the sound output unit 160. The switch 196 may be controlled based on the current driving rate of the operating sections in the display apparatus 10. Further, the switch 196 may be controlled so that the power can be supplied to the external apparatus 2 in accordance with the current brightness level of the monitor in the external apparatus 20, the current sound output level of the loudspeaker, and the current driving rate of the operating sections.

The display apparatus 10 according to an exemplary embodiment receives information about the power used by the operating sections of the external apparatus 20 and calculates the level of the power to be supplied to the external apparatus 20, thereby supplying power to the external apparatus 20 based on the calculated level of the power.

Further, the display apparatus 10 according to an exemplary embodiment calculates the level of the power to be supplied to the external apparatus 20 based on the information about the power used by the operating section such as the display 10 of the display apparatus, and thus supplies power based on the calculated level to the external apparatus 20

In addition, the display apparatus 10 according to an exemplary embodiment calculates the level of the power to be supplied to the external apparatus 20 by receiving information about the power used by the operating section of the external apparatus 20, and calculates the level of the power to be supplied to the external apparatus based on information about the power used by the operating section such as the display 110 in the display apparatus 10, thereby calculating total level of the power to be supplied to the external apparatus 20 based on the two calculated levels of the power. Then, the total calculated power is supplied to the external apparatus.

Although one or more exemplary embodiments have been shown and described, it will be appreciated by those skilled in the art that changes may be made in the exemplary embodiments without departing from the principles and spirit of the invention, the scope of which is defined in the appended claims and their equivalents.

What is claimed is:

1. A display apparatus comprising:
a display configured to display an image;
a connecting section configured to connect with an external apparatus, the external apparatus comprising at least one operating section and a charging section to be charged with power to be supplied to the operating section;
a power supply configured to supply power to the display and the external apparatus connected to the connecting section; and
a controller configured to:
receive information about power used by the external apparatus connected to the connecting section,
identify power, which is used by the display from among power needed for maximum brightness of the display,
identify a level of power to be supplied to the external apparatus according to the received power information and the identified power, and
control the power supply to supply power having the identified level to the external apparatus.

2. The display apparatus according to claim 1, wherein the controller is further configured to request information about maximum usable power of the external apparatus to the external apparatus, and receive the information about maximum usable power of the external apparatus from the external apparatus.

3. The display apparatus according to claim 1, wherein the connecting section comprises a universal serial bus (USB) C-type.

4. The display apparatus according to claim 1, wherein the controller is further configured to identify the level of the power based on at least one among image quality information about image display in the external apparatus, sound information, and driving rate information of the operating section.

5. The display apparatus according to claim 1, further comprising a sound outputter configured to output a sound, wherein the controller is further configured to identify the level of the power based on at least one among image quality information of the display, sound information of the sound outputter, and driving rate information of the display apparatus.

6. The display apparatus according to claim 1, wherein the power supply comprises a first output power line through which a first output power is output, and a second output power line through which a second output power that is different from the first output power is output.

7. The display apparatus according to claim 6, wherein one of the first output power line and the second output power line is connected to the connecting section, and the other of the first output power line and the second output power line is connected to the display.

8. The display apparatus according to claim 6, wherein a voltage corresponding to the external apparatus is output through the first output power line, and a voltage of the second output power is higher than the voltage of the first output power.

9. The display apparatus according to claim 6, further comprising a power regulator configured to regulate a level of the power output from the power supply,
wherein the power regulator is disposed between the power supply and the connecting section.

10. The display apparatus according to claim 9, further comprising a transformer configured to transform a voltage output from the power supply,
wherein a third output power line is branched from a point on an output line between the power supply and the display, and the transformer is disposed in the third output power line between the branched point and the power regulator.

11. The display apparatus according to claim 10, wherein the transformer is disposed in the third output power line between the branched point and the connecting section.

12. The display apparatus according to claim 11, further comprising a switching section for selectively connecting the branched point and the transformer,
wherein the controller is further configured to control the switching section to connect the branched point and the transformer in response to the identified power of the display being lower than the maximum usable power.

13. The display apparatus according to claim 10, further comprising a switching section for selectively connecting the branched point and the transformer,
wherein the controller is further configured to control the switching section to connect the branched point and the transformer in response to the identified power of the display being lower than the maximum usable power.

14. The display apparatus according to claim 6, further comprising a third output power line branched from a point on an output line between the power supply and the display, to connect the power supply from the branched point to the connecting section.

15. The display apparatus according to claim 14, further comprising a transformer configured to transform a voltage output from the power supply,
wherein the transformer is disposed in the third output power line.

16. A method of controlling a display apparatus, the method comprising:
- connecting with an external apparatus comprising at least one operating section and a charging section to be charged with power to be supplied to the operating section;
- receiving information about power used by the external apparatus;
- identifying power, which is used by a display from among power needed for maximum brightness of the display;
- identifying a level of power to be supplied to the external apparatus according to the received power information and the identified power of the display; and
- supplying power having the identified level to the external apparatus.

17. The method according to claim 16, wherein the receiving the power information comprising:
- requesting information about maximum usable power of the external apparatus to the external apparatus, and receiving the information about maximum usable power from the external apparatus.

18. The method according to claim 16, wherein the connection with the external apparatus is achieved by a universal serial bus (USB) C-type.

19. The method according to claim 16, wherein the identifying the level of the power comprises identifying the level of the power based on at least one among image quality information about image display in the external apparatus, sound information, and driving rate information of the operating section.

20. The method according to claim 16, wherein the identifying the level of the power comprises identifying the level of the power based on at least one among image quality information of the display, sound information, and driving rate information of the display apparatus.

* * * * *